(No Model.)
S. ELLIOTT.
WHEEL SUPPORT FOR VEHICLES.
No. 507,068. Patented Oct. 17, 1893.
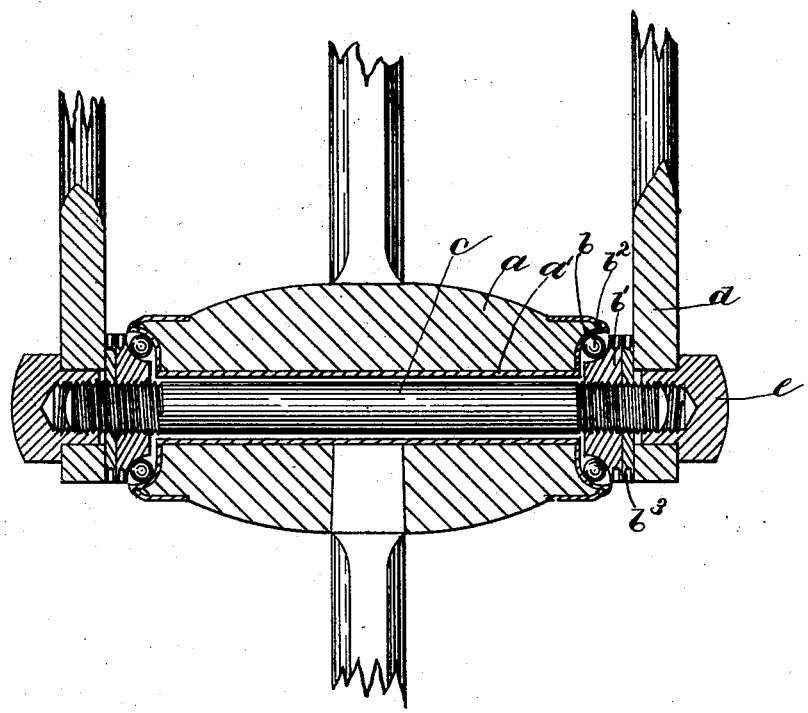
WITNESSES.
Chas. T. Blocket.
Lucy F. Graves.
INVENTOR.
Sterling Elliott.
by B. J. Noyes.
Atty.

UNITED STATES PATENT OFFICE.

STERLING ELLIOTT, OF NEWTON, ASSIGNOR TO THE HICKORY WHEEL COMPANY, OF SOUTH FRAMINGHAM, MASSACHUSETTS.

WHEEL-SUPPORT FOR VEHICLES.

SPECIFICATION forming part of Letters Patent No. 507,068, dated October 17, 1893.

Application filed November 21, 1892. Serial No. 452,710. (No model.)

*To all whom it may concern:*

Be it known that I, STERLING ELLIOTT, of Newton, county of Middlesex, State of Massachusetts, have invented an Improvement in Wheel-Supports, of which the following description, in connection with the accompanying drawing, is a specification, like letters on the drawing representing like parts.

In bicycles, sulkies, and other vehicles where the wheels are supported by depending arms or forks, it is frequently necessary to remove the wheels, and if said wheels are provided with ball bearings much difficulty is experienced in replacing the wheels, if when removed the co-operating parts of said ball bearings are displaced, or disassociated.

The axle which supports the wheel usually projects at each end through small holes in the extremities of the supporting arms, and nuts have been screwed onto the projecting ends of said axle to hold the parts assembled, but in practice the exposed ends of the axle rust, and unless the length of the axle is very accurately determined the ends thereof will either project beyond the outer faces of the nuts or will present recesses or sockets at said outer faces, in either event departing from the handsome finish which is desirable in all first class machines, and furthermore in order to remove the wheel the arms of the forks must be sprung apart to disengage them from the ends of the axle, so that if the projecting ends of the axle can be made quite short, the distance required for moving the arms will be materially decreased. As the weight of the rider is brought upon the fork, and thereby actually sustained by the small projecting ends of the axle, it has been found in practice that the larger the bearing surface at such point, the better, and furthermore it is important that the bearing should not come directly upon the screw threads thereof.

This invention therefore has for its object to so improve the construction of the support for the wheel that the above objections may be overcome namely:—that the wheel may be readily removed by separating the arms of the fork but a short distance and thereafter replaced; and if provided with ball bearings they may be removed with the wheel without disassociating or altering the adjustment of the co-operating parts thereof, so that no difficulty whatever is experienced in replacing the wheel with its ball bearings, and that the ends of the axle may be entirely concealed and less pains required in determining the length of said axle, and larger bearing surfaces presented to the supporting arms, which remove them from direct contact with the screw threaded portions. By not allowing the axle to project through the supporting fork the wheel may be taken out without springing apart the forks to an objectionable extent.

The drawing shows in vertical longitudinal section, the hub of a wheel having ball bearings in connection with supports therefor embodying this invention.

The hub $a$, of the wheel, which is herein shown as made of wood, may be of any other suitable material and shape. This hub is bored axially to receive the tube $a'$, which has secured to it at each end a ball receiving cup $b$, contained in sockets formed in the ends of the hub $a$. The axle $c$, is made smaller in diameter than the tube $a'$, and is somewhat longer, the projecting ends being externally screw-threaded. Annularly grooved collars or disks $b'$, of any usual form are screwed onto the screw threaded ends of said axle $c$, which co-operate with the cups $b$ to hold the balls $b^2$, in position, adjustment being effected by turning said collars or disks $b'$, on the axle toward or from the cups $b$. Collars or disks $b^3$, are also screwed on said axle $c$, abutting against the disks $b'$, which serve as check nuts for the disks $b'$. The lower extremities of the arms $d$ of the fork have transverse holes through them, larger in diameter than the axle $c$, which when placed upon the outwardly projecting ends of said axle, abut against the collars or disks $b^3$.

Cap nuts $e$, are provided having internally screw threaded sockets, which receive the externally screw threaded projecting ends of the axle $c$, the body portions of said nuts in which the sockets are formed being of suitable diameter to fit the holes formed in the extremities of the arms $d$, of the forks, while the heads of said nuts are made somewhat larger in diameter than the body portions to present a flange or shoulder which abuts against the outer faces or sides of said arms $d$. These nuts it will be seen entirely inclose or conceal the ends of the axle $c$, and if the axle should vary in length, or the arms $d$ in thickness, the sockets are made deep enough to accommodate any such slight variations. The large body portions of said nuts present large bearing surfaces for the extremities of the forks, while removing said arms from direct contact with the screw threaded portions of the axle. By removing the nuts $e$, it will be seen that the wheel with its ball bearings assembled may be removed and thereafter replaced, and thereby all the results sought for obtained. It is obvious that the ball bearings may be omitted if desired without affecting the other parts of my invention.

The disks $b'$, $b^3$, are each provided on their periphery with holes to receive a spanner, by means of which adjustment of the ball bearings may be effected without disassociating the parts.

The projecting ends of the axle $c$, are made much shorter than usual, so that the arms $d$, may be disengaged therefrom without separating them but a short distance.

I claim—

1. The combination of the supporting arms $d$, for the wheel having transverse holes at their extremities, the axle $c$, having externally screw threaded ends terminating within the transverse holes in said supporting arms, ball bearings for the wheel, comprising the annularly grooved collars or disks $b'$, screwed onto the screw threaded ends of said axle, cap nuts $e$, the body portions of which enter the transverse holes in said supporting arms and are internally screw threaded to receive the ends of the axle therein, while the heads abut against the outer sides or faces of said arms and hold the parts assembled, substantially as described.

2. The combination of an axle having externally screw threaded ends, ball bearings for the wheel comprising the annularly grooved collars or disks $b'$ screwed onto the screw threaded ends of the axle, and the disks $b^3$, also screwed onto the screw threaded ends of the axle, and abutting against the disks $b'$, the nuts $e$, the body portions of which enter transverse holes in the extremities of the supporting arms $d$, and are internally screw threaded to receive the projecting screw threaded ends of the axle, while the heads abut against the outer sides or faces of said arms $d$, substantially as described.

In testimony whereof I have signed my name to this specification in the presence of two subscribing witnesses.

STERLING ELLIOTT.

Witnesses:
BERNICE J. NOYES,
LUCY F. GRAVES.